(12) United States Patent
Pribula et al.

(10) Patent No.: US 11,603,038 B2
(45) Date of Patent: Mar. 14, 2023

(54) SMART REAR LIGHTING SYSTEM (71) Applicant: Custom Dynamics LLC, Youngsville, NC (US)

(72) Inventors: David Todd Pribula, Wake Forest, NC (US); Christopher Brian LaGrave, Moulton, AL (US)

(73) Assignee: Custom Dynamics LLC, Youngsville, NC (US)

( * ) Notice: Subject to any disclaimer, the term of this patent is extended or adjusted under 35 U.S.C. 154(b) by 59 days.

(21) Appl. No.: 16/905,303

(22) Filed: Jun. 18, 2020

(65) Prior Publication Data
US 2021/0394669 A1 Dec. 23, 2021

(51) Int. Cl.
*B60Q 1/30* (2006.01)
*H05B 45/20* (2020.01)
*B60Q 1/34* (2006.01)
*B60Q 1/00* (2006.01)
*B60Q 1/44* (2006.01)

(52) U.S. Cl.
CPC ............ *B60Q 1/30* (2013.01); *B60Q 1/0076* (2013.01); *B60Q 1/34* (2013.01); *B60Q 1/44* (2013.01); *H05B 45/20* (2020.01); *B60Q 2400/20* (2013.01)

(58) Field of Classification Search
None
See application file for complete search history.

(56) References Cited

U.S. PATENT DOCUMENTS

| 6,361,196 B1 | 3/2002 | Boucheron et al. |
| 6,550,949 B1 * | 4/2003 | Bauer ................. B60Q 1/0023 362/800 |
| 7,355,347 B1 * | 4/2008 | Bell ..................... B60Q 1/26 315/80 |
| 7,500,770 B2 | 3/2009 | Medina |
| 8,009,031 B2 | 8/2011 | Pacheco et al. |
| 8,466,621 B2 | 6/2013 | Pribula et al. |

(Continued)

FOREIGN PATENT DOCUMENTS

| CN | 103982844 A | 8/2014 |
| EP | 2827250 B1 | 3/2017 |

(Continued)

OTHER PUBLICATIONS

Saponara et al., "Design of a multi-channel LED lighting system on flexible supports for high-end 2-wheel vehicles," 2016 IEEE 16th International Conference on Environment and Electrical Engineering, 2016, pp. 1-4.

*Primary Examiner* — Crystal L Hammond
(74) *Attorney, Agent, or Firm* — Coats & Bennett, PLLC (57) ABSTRACT

A control system for a turn/brake light of a vehicle, includes a control circuit configured to receive a plurality of analog voltage inputs and to deliver an analog voltage output based at least upon the plurality of inputs. A light emitter is connected to the control circuit. The light emitter includes at least one dual-color LED configured to be selectively illuminated based on the analog voltage output. The control circuit can receive a turn/brake signal and produce at least a first output voltage and a second output voltage. The dual-color LED produces a first color output in response to the first output voltage level and a second color output in response to the second output voltage level.

20 Claims, 7 Drawing Sheets

(56) References Cited

U.S. PATENT DOCUMENTS

| | | |
|---|---|---|
| 8,564,205 B2 | 10/2013 | Roberts et al. |
| 8,604,922 B2 | 12/2013 | Harris |
| 9,539,932 B2 | 1/2017 | Fay |
| 10,363,865 B2 | 7/2019 | Bartell et al. |
| 2002/0171543 A1* | 11/2002 | Abbe ........................ B60Q 1/46 340/815.45 |
| 2005/0073401 A1* | 4/2005 | Currie ....................... B60Q 1/26 340/815.4 |
| 2008/0122606 A1* | 5/2008 | Bradley ................ B60Q 1/0017 340/468 |
| 2008/0130303 A1 | 6/2008 | Medina et al. |
| 2012/0092151 A1 | 4/2012 | Pribula et al. |
| 2012/0243246 A1 | 9/2012 | Waring |
| 2012/0299476 A1* | 11/2012 | Roberts ................ B60Q 1/2607 315/77 |
| 2013/0051055 A1* | 2/2013 | Omidfar ................. F21S 43/20 362/228 |
| 2013/0190972 A1* | 7/2013 | Pribula .................... B60Q 1/38 701/36 |
| 2017/0120804 A1* | 5/2017 | Kentley ................ B60W 30/08 |
| 2019/0315268 A1 | 10/2019 | Garvey |
| 2020/0114815 A1* | 4/2020 | Massengill ............ B60Q 1/503 |

FOREIGN PATENT DOCUMENTS

| | | |
|---|---|---|
| EP | 3168625 B1 | 1/2020 |
| WO | 2017058120 A1 | 4/2017 |
| WO | 2019166500 A1 | 9/2019 |

* cited by examiner

SMART REAR LIGHTING SYSTEM

FIELD

Various exemplary embodiments relate to a rear lighting system that utilizes turn signal comprising dual-color LEDs that can be used to signal a straight brake, a turn, or a brake turn.

BACKGROUND

Motor vehicles may use several lights positioned on the vehicle to indicate information to other drivers and pedestrians. In such cases, several lights may be mounted on the rear end of the vehicle to signal drivers and pedestrians behind the vehicle. Additional lights may be placed on the sides of the vehicle, near the rear, to provide additional signals to drivers behind the vehicle, especially those that might be positioned on the left or right of the vehicle.

Some vehicle-mounted lights are generally for the purpose of signaling a vehicle's motion or a driver's intentions to other drivers. In some cases including but not limited to the use of lights on motorcycles, a center rear-positioned light may be used as a brake signal, while lights positioned on either side of the seat or back wheel may be used as turn signals. In some cases, a center rear-positioned light may not be present and only turn signals or other lights may be positioned in the rear of the vehicle. There is therefore a need for a method and product for clearly indicating vehicle motion or rider intent when a comprehensive set of individual dedicated indication lights are not positioned at the rear of the vehicle. The disclosed methods and products provide an avenue for clearly indicating vehicle action or driver intent with relatively few lights.

Bulbs using light-emitting diodes (LEDs) rather than incandescent filaments are becoming increasingly popular, both as factory-installed equipment and as replacement parts for installation into standard sockets.

Certain drivers may desire enhanced visibility of their vehicles. This is a particular concern for many motorcycle drivers, as motorcycles are often overlooked by other drivers. Motorcycle lighting that is highly visible, clearly indicative of motorcycle motion or rider intent, and adaptable to a non-comprehensive or limiting lighting arrangement has been sought after. Accordingly, improved lighting systems for vehicles are needed.

SUMMARY

In an aspect, the disclosure relates to a tail light assembly for a vehicle comprising an analog voltage-driven dual-colored LED.

In one aspect, the disclosure relates broadly a method of selectively lighting a smart rear lighting system light by sending varying voltages to a voltage-sensitive dual-colored LED based at least upon brake only and turn/brake signals from a vehicle.

In one aspect, a control system for a turn/brake light of a vehicle, includes a demultiplexing circuit configured to receive a plurality of analog voltage inputs and to deliver an analog voltage output based at least upon the plurality of inputs. A light emitter is connected to the demultiplexing circuit. The light emitter includes at least one dual-color LED configured to be selectively illuminated based on the analog voltage output. The analog voltage inputs include a turn/brake signal and the analog voltage output includes a first output voltage and a second output voltage. The dual-color LED produces a first color output in response to the first output voltage level and a second color output in response to the second output voltage level.

Some aspects include a method of selectively lighting a smart rear lighting system light. A plurality of analog voltage inputs are received from a vehicle including an analog voltage turn/brake signal. In response to the plurality of analog voltage inputs, a first output voltage and a second output voltage are delivered to a voltage-sensitive dual-color LED of a vehicle turn/brake light. The voltage-sensitive dual-color LED produces a first color output in response to the first output voltage level and a second color output in response to the second output voltage level.

In some aspects, a control circuit that selectively operates a turn/brake light of a vehicle includes a demultiplexing circuit configured to receive a plurality of analog voltage inputs and to deliver an analog voltage output based at least upon the plurality of inputs. An output stage includes a plurality of switches to selectively operate an LED array. A controller is configured to control the output stage to illuminate the LED array, the controller being configured to operate the plurality of switches to display a first sequence on the LED array. The analog voltage inputs include a turn/brake signal produced by a vehicle. The analog voltage output includes a first voltage output and a second voltage output. The LED array includes a plurality of dual-color LED's and produces a first color output in response to the first voltage level and a second color output in response to the second voltage level.

In some aspects, vehicle's brake light(s) and turn light(s) may be independently operable so that braking or turning may be indicated by the brake or turn light(s), respectively. A brake light may be constructed and arranged to be continuously illuminated while the vehicle is braking but darkened or completely dark when the vehicle is not braking. Additionally, a turn light may be constructed and arranged to be illuminated in a flashing pattern while the vehicle is turning but darkened or completely dark when the vehicle is not turning. In some cases, if the vehicle is braking and turning, the brake light(s) may be continuously illuminated while a corresponding turn light is illuminated and darkened or made completely dark in a flashing pattern.

The disclosure provides for other aspects and embodiments that will be apparent in light of the following detailed description and accompanying figures.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

As used in this application, the term "or" is meant to be interpretable in an inclusive manner. As a non-limiting example, if "a machine comprising a first or second component" is disclosed, this may be interpreted to mean all of a machine having only a first component, a machine having only a second component, and a machine having both a first and second component.

In a number of embodiments, a vehicle may operate at least one light emitting device to signal vehicle movement or intended movement. The light emitting device may be part of a light fixture comprising a plurality of such light emitting devices that may be independently illuminated and used for signaling during operation of the vehicle. Signaling may include signaling a turn, signaling a brake, signaling a no brake and no turn. Multiple light fixtures may be used together to provide a comprehensive range of signaling for the vehicle. To that end, "comprehensive" in such cases may be determined by the number of variety of vehicle signals enumerated or required by a regulating body before a vehicle may be legally permitted to use roads. As a non-limiting example, a regulating body such as but not limited to a department of transportation may require that a vehicle must have the capability to signal a brake and a turn via a properly located light emitting device before it the vehicle is legally permitted to use any given road. Further, the regulating body may set forth requirements for what color of light each light emitting device must emit in order to properly signal a brake, a turn, and so forth.

In a number of embodiments, a single light emitting device may be capable of emitting different colors of light in response to a signal received as input and having a particular property. As a non-limiting example the light emitting device may be a voltage-sensitive dual-color LED that is capable of emitting a red color at a lower voltage such as 3V and an amber color at a high voltage such as 12V. As another non-limiting example, the light emitting device may also be a current-sensitive dual-color LED that is capable of emitting a red color at a higher current such as 20 mA and an amber color at a lower current such as 10 mA. Although the term dual-color LED is used herein to describe red and amber color outputs from a single LED, the term can also encompass LEDs that are capable of emitting more than two colors (i.e., the term can be synonymous with an at-least-dual-color LED). Further, it is contemplated that closely located or paired single-color LEDs may be used to simulate the properties of a single dual-color LED.

In a number of embodiments, a vehicle may be equipped with an incandescent signaling light that may operate on analog voltage. An incandescent light may be used as a light emitting device in a fixture dedicated to operating as a signaling light for the vehicle. In some cases, a vehicle may be retrofitted to operate at least one LED light with analog voltage and the LED light may also be used in conjunction with a light fixture used for signaling during operation of the vehicle. An LED light may be in electrical communication with a voltage regulator for the purpose of directing a proper amount of voltage to the LED light without the need to modify the original voltage source. Similarly, an LED light may be in communication with an input circuit that allows a voltage step-down or step-up to provide a desirable voltage level to the LED light.

Figure 1:
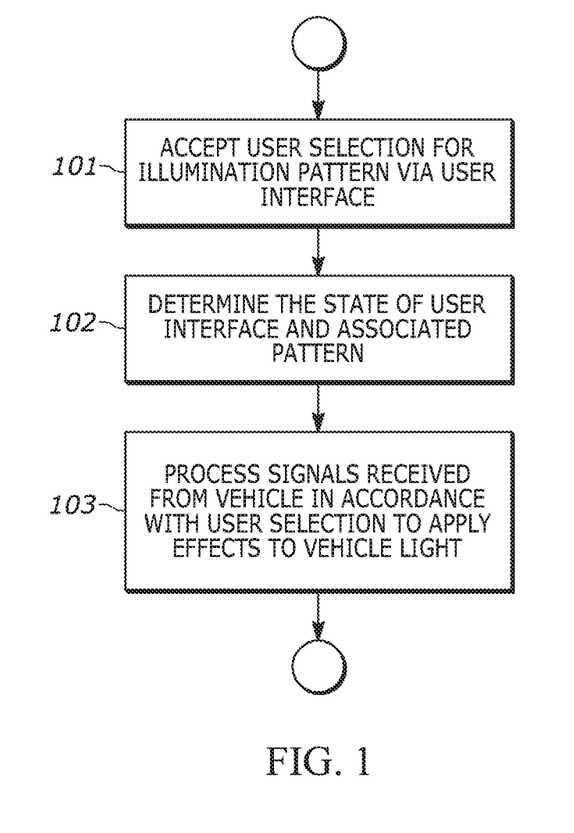
FIG. 1 depicts a flow chart diagram of using a control circuit and user interface to control the display of lights on a vehicle.

Referring to FIG. 1, a control circuit may be configured to control the signal lights of a vehicle. A control circuit may be specially designed for use on motorcycles that have braking and turning signal lights. A control circuit constructed and arranged for such a purpose may comprise multiple controllers, circuit components, signal-carrying lines, or other circuit components that may change the system for enabling the products and methods described herein.

A control circuit of this type may be in communication with one or more controls that allow a user to select a type of modulation or other effect to be applied to a vehicle's signal lights. A control circuit may allow the user to select a modulation pattern or other effect to be displayed by at least one vehicle signal light for a number different operating modes. In one embodiment, the control circuit may be in electrical communication with a selector device such as a rotary switch. A rotary switch may enable a user to select a braking pattern to be applied to at least one signal light of the vehicle via the generation of switching signals by a control circuit. An additional selection device such as but not limited to a toggle switch or rotary switch may be used to select the signal lights on which a selected braking pattern is to be applied.

As depicted in FIG. 1, a device capable of supporting a digital or analog user interface for making selections with regard to signal light usage and illumination patterns may be in communication with a control circuit as described herein or a device in communication with such a control circuit via a wired or wireless connection. At step 101 a user may make a selection of an illumination pattern for a signal light via a user interface. A device supporting a user interface may include software for configuring the signal light illumination pattern or other control settings according to a user's preferences. In some cases, a user interface may also include other configurations for the user to enter the desired information such as but not limited to a keypad, touch screen, etc. The user interface may also comprise analog user controls such as but not limited to switches, buttons, keys, sliders, etc.

At step 102, a processing circuit may determine the state of a selection device that may be used for selecting signal light usage and illumination patterns and may communicate that state to a control circuit as described herein. In some cases, a processing circuit may store the determined states in memory accessible by a control circuit. In one or more embodiments a selected illumination pattern may correspond to a state of a selection device.

In a number of embodiments, a control circuit may apply special effects to the vehicle's signal lights to enhance their effectiveness in alerting other drivers and improve safety. This application may occur as a result of the state of the selection device in step 102. In step 102, the control circuit may apply predetermined patterns selected by a user to a brake light or a turn light to increase the likelihood of alerting drivers of other vehicles. The control circuit also may be configured to vary the intensity, color, or other property of the brake and/or turn lights.

In step 103, the control circuit may process at least one input signal received from a vehicle during operation of the vehicle and communicate at least one output signal to apply special effects to the vehicle's signal lights according to user selected preferences. As part of the processing, the control circuit may logically separate out analog voltage brake or turn signals from composite input signals to determine the signaling state of the vehicle and to determine the desired effect for each warning light. In such a case, the control circuit may communicate at least one output signal to achieve the desired effect based at least upon the separated signals. The output signal(s) communicated by the control circuit may include a brake output signal, a left turn signal, a right turn signal, and a run signal. In some cases, a control circuit may communicate such signals by logically generating switching signals that allow analog voltages originating from an input to selectively flow to a vehicle light such as but not limited to an incandescent light or an LED array. Additionally, the control circuit may be constructed and arranged to detect changes to the signaling state of the vehicle or a change to input conditions and to generate new switching signals.

Figure 2:
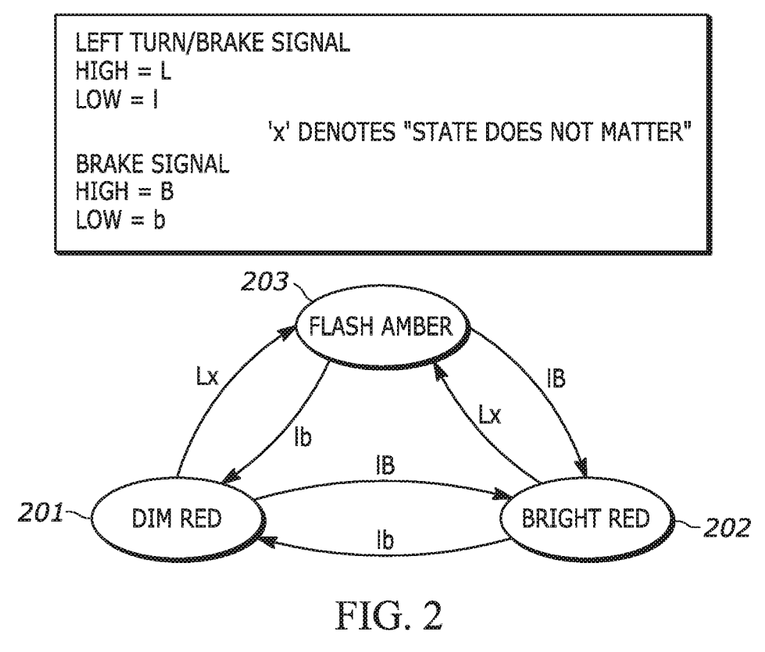
FIG. 2 depicts a state transition diagram of the sequential logic underpinning the lighting scheme for a left turn signal.

As depicted in FIG. 2, presuming the motorcycle is running, a demultiplexing circuit may receive analog signals and handle them such that a left turn signal may emit a dim red light in state 201 to indicate a run status when the analog brake signal and the left turn/brake signal are both low. In such embodiments, state 201 may be exited when the demultiplexing circuit receives either a high brake signal on a brake signal line or by receiving a high left turn/brake signal on a left turn/brake signal line. In the former case, state 202 may be entered and the left turn signal may emit a bright red light to indicate a braking status so long as a high left turn/brake signal is not also received by the demultiplexing circuit on the left turn/brake signal line. If a high left turn/brake signal is received by the demultiplexing circuit on the left turn/brake signal line, state 203 may be entered by the demultiplexing circuit and the left turn signal may emit a flashing amber light to indicate a turning status. From state 203, either state 201 or state 202 may be entered, but a transition to either of those states may be contingent upon the sign on the left turn/brake signal line turning low. In such a case, if a high brake signal is received by the demultiplexing circuit on the brake signal line, the demultiplexing circuit enters state 202 and the left turn signal may emit a bright red light to indicate a braking status. Also in such a case, if a low brake signal is received by the demultiplexing circuit on the brake signal line, the demultiplexing circuit enters state 201 and the left turn signal may emit a dim red light to indicate a run status.

Figure 3:
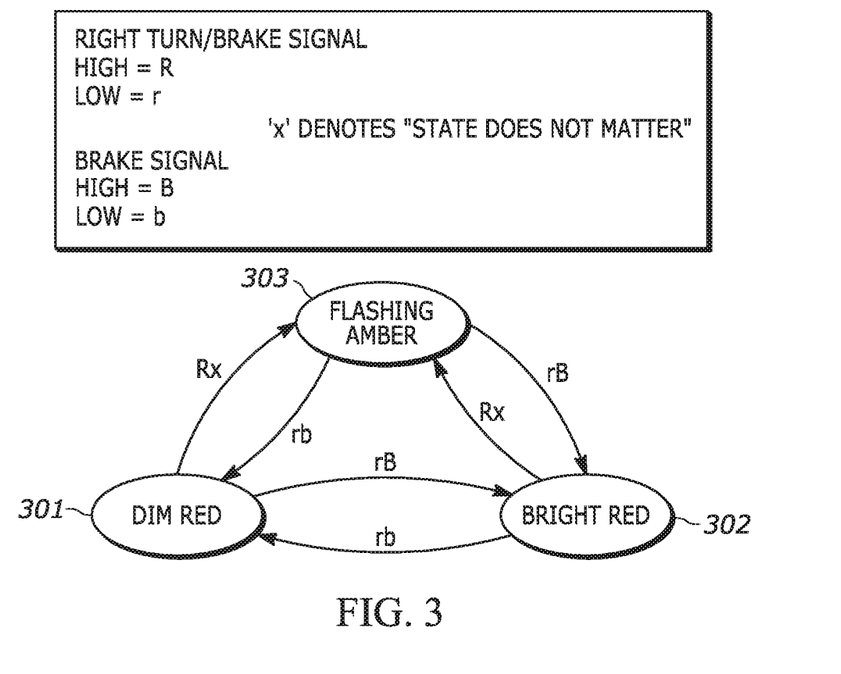
FIG. 3 depicts a state transition diagram of the sequential logic underpinning the lighting scheme for a right turn signal.

Referring an exemplary embodiment depicted in FIG. 3, which is similar to FIG. 2. Again, presuming the motorcycle is running, a demultiplexing circuit may receive analog signals and handle them such that a right turn signal may emit a dim red light in state 301 to indicate a run status when the analog brake signal and the right turn/brake signal are both low. In such embodiments, state 301 may be exited when the demultiplexing circuit receives either a high brake signal on a brake signal line or by receiving a high right turn/brake signal on a right turn/brake signal line. In the former case, state 302 may be entered and the right turn signal may emit a bright red light to indicate a braking status so long as a high right turn/brake signal is not also received by the demultiplexing circuit on the right turn/brake signal line. If a high right turn/brake signal is received by the demultiplexing circuit on the right turn/brake signal line, state 303 may be entered by the demultiplexing circuit and the right turn signal may emit a flashing amber light to indicate a turning status. From state 303, either state 301 or state 302 may be entered, but a transition to either of those states may be contingent upon the sign on the Right Turn/Brake Signal Line turning low. In such a case, if a high brake signal is received by the demultiplexing circuit on the brake signal line, the demultiplexing circuit enters state 302 and the right turn signal may emit a bright red light to indicate a braking status. Also in such a case, if a low brake signal is received by the demultiplexing circuit on the brake signal line, the demultiplexing circuit enters state 301 and the right turn signal may emit a dim red light to indicate a run status.

Referring to FIG. 2 and FIG. 3, only one of the left turn/brake signal or the right turn/brake signal may be high at a single time. The vehicle may only allow a single turn signal to be engaged at a time via the use of a turn signal control such as but not limited to a turn signal toggle, button, switch, slider, or stalk having a designated left turn indicator position, a right turn indicator position, and a neutral position. It may be the case that both of the turn signals are constructed and arranged to both flash amber or red when a hazard mode control is engaged, but this mode of operation might not be induced by the use of a turn signal control such as but not limited to a turn signal toggle, button, switch, slider, or stalk and may even be constructed and arranged to override such turn signal controls. Further, instead of emitting a dim red light in stat 102 or 202, the turn signal may simply turn off and emit no light.

States 201 and 301 use the word "dim" within the phrase "dim red." The word "dim" is referring to the relatively lower brightness of the red light emitted from the turn signal lights as compared to the relatively brighter red "bright Red" light emitted from the turn signals in states 103 and 203. In a braking state as shown in state 103 and 203, the turn signals may strobe red for the purpose of drawing attention to the braking action of the vehicle.

Figure 4:
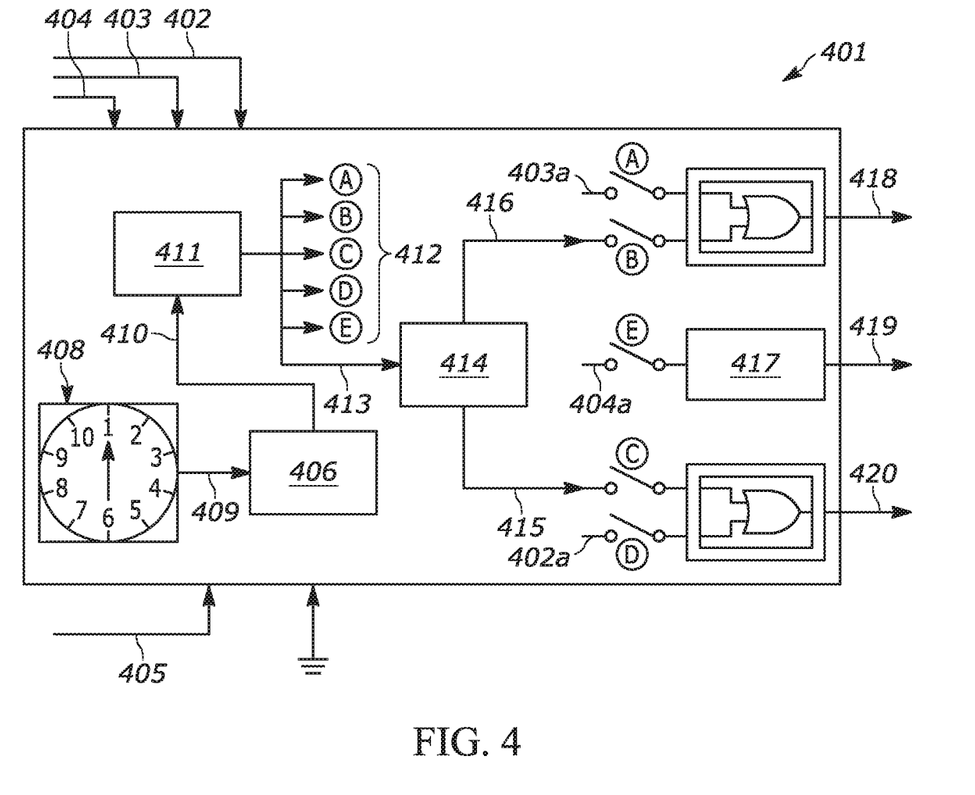
FIG. 4 depicts a block diagram incorporating switches and exhibiting the logical objectives of a smart lighting system.

Referring to FIG. 4, a smart rear lighting system may accept a number of analog inputs from a motorcycle such as but not limited to a left turn/brake signal line and a brake signal line. These analog signals line may each communicate a high state and a low state for the associated signal. As a non-limiting example, a brake signal line may communicate a high state by maintaining a certain power characteristic on the brake signal line such as a particular voltage, current, frequency, phase, or any other known power characteristic. For example, a high brake signal may be indicated, to any device that may receive the signal, by a voltage of 7.5V being maintained on the brake signal line. As another non-limiting example, a brake signal line may communicate a low state by maintaining a certain power characteristic that is distinct from the high state characteristic on the brake signal line such as a particular voltage, current, frequency, phase, or any other known power characteristic. As a non-limiting example, a low brake signal may be indicated, to any device receiving that signal, by a voltage of 0V being maintained on the brake signal line.

Still referring to FIG. 4, a demultiplexing circuit 401 may be constructed and arranged to take as inputs a left brake/turn line 402, a right brake/turn line 403, a brake line 404, and a run line 405. The demultiplexing circuit 401 may be further constructed and arranged to demultiplex the signals on these lines via a microcontroller 411 in order to produce a plurality of switching signals 412. An analog voltage reducer/converter 414 may convert or reduce an input voltage to a level calculated to induce a desired effect in an input sensitive dual-color LED such as but not limited to a voltage-sensitive dual-color LED. As a non-limiting example, an input voltage of 12V may be reduced by the analog voltage reducer/converter 414 to a voltage in the range of 7.5V, or 8.5V-6.5V, for the purpose of inducing a voltage-sensitive LED to emit a red light to indicate a brake status. This reduction or conversion of voltage may be part of the logical organization of the demultiplexing circuit in that the reduction or conversion of voltage may be necessary for inducing at least one turn signal comprising at least one voltage-sensitive LED to emit a predetermined color light at a predetermined brightness when the plurality of switching signals 412 induce a plurality of switches A, B, C, D, E to allow the reduced or converted voltage to flow to at least one turn signal.

To that end, input line 413 may direct an electrical signal having a particular voltage to the voltage reducer/converter 414 where the voltage of the signal on input lead 413 is reduced or converted, and directed via line 415 and 416 to switches C and B, respectively. The switches B, C may be configured to allow the reduced or converted signals on lines 415, 416 to pass through the switches B, C respectively when a brake state for the vehicle is determined by the microcontroller 411. The analog voltage signal carried by the right brake/turn line 403 may be directed to line 403a and on to switch A. Similarly, the analog voltage signal carried by the left brake/turn line 402 may be directed to line 402a and on to switch D. If it is determined by the microcontroller 411 based at least upon analog signals 402, 403, and 404 that a right turn without brake or a left turn without brake is being communicated, microcontroller 411 may ensure that an input turn/brake voltage in the range of 12V, or 13V-11V, is delivered along lines 403a or 402a, and through switch A or D respectively. To that end, microcontroller 411 may close switch A or switch D respectively to ensure that the voltage signal is delivered to the appropriate $MUX_{LEFT}$ 420 or $MUX_{RIGHT}$ 418 output.

The microcontroller 411 may determine that the left turn/brake signal line 402 is high, and that the brake signal line 404 is low. The microcontroller 411 may determine that such a combination of signals is a communication of a left turn without brake by the vehicle via the analog signals 402 and 404, and may therefore close switch D and open switches A, B, C, and E in response to this determination. The closing of switch D may allow line 402a to pass the analog voltage signal on left turn/brake line 402 through to a first OR gate circuit for comparison with a reduced or converted voltage signal on line 415. The signal resulting from this comparison may flow through to $MUX_{LEFT}$ output 420. Similarly, the microcontroller 411 may determine that the right turn/brake signal line 403 is high, and that the brake signal line 404 is low. The microcontroller 411 may determine that such a combination of signals is a communication of a right turn without brake by the vehicle via the analog signals 403 and 404, and may therefore close switch A and open switches B, C, D, and E in response to this determination.

The closing of switch A may allow line 403a to pass the analog voltage signal on right turn/brake line 403 through to a second OR gate circuit for comparison with a reduced or converted voltage signal on line 416. The signal resulting from this comparison may flow through to $MUX_{RIGHT}$ output 418. Additionally, the brake signal line 404 may communicate an analog voltage brake signal through line 404a to protected switch 417 via switch E. Upon flowing through the protected switch 417, the analog voltage brake signal on line 404a may flow through to brake output 419. To that end, if microcontroller 411 determines from analog voltage signals 402, 403, 404 that a left turn with brake status is indicated, the microcontroller may close switches B, D, and E and open switches A and C. Such a determination by the controller 411 may occur when the left turn/brake signal line 402 is high and the brake signal line 404 is also high. Alternatively, if microcontroller 411 determines from analog voltage signals 402, 403, 404 that a right turn with brake status is indicated, the microcontroller may close switches A, C, and E and open switches B and D. Such a determination by the controller 411 may occur when the right turn/brake signal line 403 is high and the brake signal line 404 is also high.

In some cases, microcontroller 411 may determine from analog voltage signals 402, 403, 404 that a brake only status is indicated, the microcontroller may close switches B, C, and E and open switches A and D. Such a determination by the controller 411 may occur when the brake signal line 404 is high and signal lines 402 and 403 are low. In the case that each of signal lines 402, 403, and 404 are low, the microcontroller may determine that a run status is indicated, and an electrical signal having a voltage in the range of 5 v, or 6 v-1 v may be routed to an output of the demultiplexing circuit 401 and accepted as input to a decoding circuit 501, 601, or a sequenced turn signal 701.

A strobe pattern decoder/generator 406 may receive a selection signal via line 409 from strobe pattern selector 408. Strobe pattern decoder/generator 406 may then generate a strobe pattern signal based at least upon a decoding of the selection signal received via line 409 and that is communicated via line 410 to microcontroller 411. A strobe pattern signal may be communicated to other components of the demultiplexing circuit or external circuits by strobe generator 406 or microcontroller 411 in response to the receipt of a particular signal by the demultiplexing circuit from the vehicle such as a brake only signal or a turn/brake signal. Microcontroller 411 may then manipulate switches such as but not limited to B, C, or E in a strobed pattern during a brake status according to the communicated strobe pattern signal to induce the vehicle lights to strobe in accordance with the generated strobe pattern signal.

Figure 5:
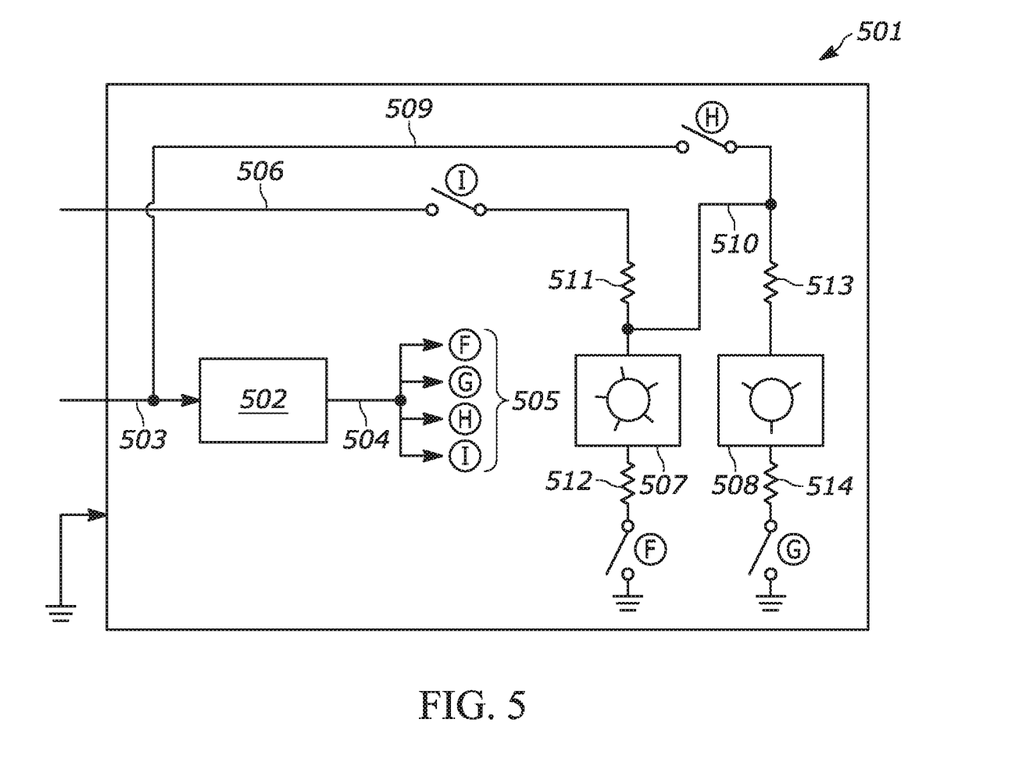
FIG. 5 depicts a block diagram incorporating switches and exhibiting the logical objectives of a non-sequencing turn signal decoding circuit for a smart lighting system incorporating dual-color LEDs.

Referring to an exemplary embodiment depicted in FIG. 5, LED array 507 and LED array 508 may actually be the same LED array, but emitting different color light depending upon the states of switches F, G, H, and I and signal delivered to the LED array. In light of the fact that signal characteristics such as but not limited to current, voltage, phase, or any other signal characteristic cannot be graphically represented for a transient signal, the LED array represented by LED array 507 and LED array 508 is split into two separate graphical representations for the purpose of illustrating that the LED array may emit red light when signals delivered to the LED array have a particular characteristic, and may emit amber light when have another, distinct characteristic.

With regard to controlling switches F, G, H, and I, turn signal decoding circuit 501 may be constructed and arranged to decode a demultiplexed turn signal line 503. Decoding circuit 501 may deliver a demultiplexed turn signal to turn signal microcontroller 502 from demultiplexeing circuit 401. That is, demultiplexed turn signal line 503 may carry a signal from output $MUX_{RIGHT}$ 418 or $MUX_{LEFT}$ 420 of the demultiplexing circuit 401. The turn signal decoding circuit 501 may be constructed with a robust logical arrangement so that it is irrelevant whether the demultiplexed signal line 503 carries a demultiplexed turn signal that came from $MUX_{RIGHT}$ 418 or $MUX_{LEFT}$ 420. Demultiplexed turn signal line 503 may carry a demultiplexed turn signal to turn signal microcontroller 502, where turn signal microcontroller 502 produces switching signals for switches F, G, H, and I based at least upon the demultiplexed turn signal. Demultiplexed turn signal line 503 may split off along line 509 before reaching turn signal microcontroller 502 and be intersected by switch C on its way toward the LED array represented by LED array 507 and LED array 508. The LED array may be an array of dual-color LEDs and microcontroller 502 may be configured to control switches F, G, H, and I.

When line 503 is not carrying a $MUX_{RIGHT}$ 418 or $MUX_{LEFT}$ 420 signal, microcontroller 502 may close switches I and F, and open switches H and G. By doing so, line 506 may direct run signal 405 through switch I, through run resistor 511 to LED array 507 to emit red light, and through brake resistor 512 and switch F to ground. When line 503 is carrying a $MUX_{RIGHT}$ 418 or $MUX_{LEFT}$ 420 signal, microcontroller 502 may determine that a turn without brake signal is carried by line 503. In such a case, microcontroller 502 may open switches F and I, and close switches G and H. In doing so, line 503 may direct a turn without brake signal along line 509 through switch H, through resistor 513, LED array 508, and resistor 514 down through switch G to ground.

Figure 6:
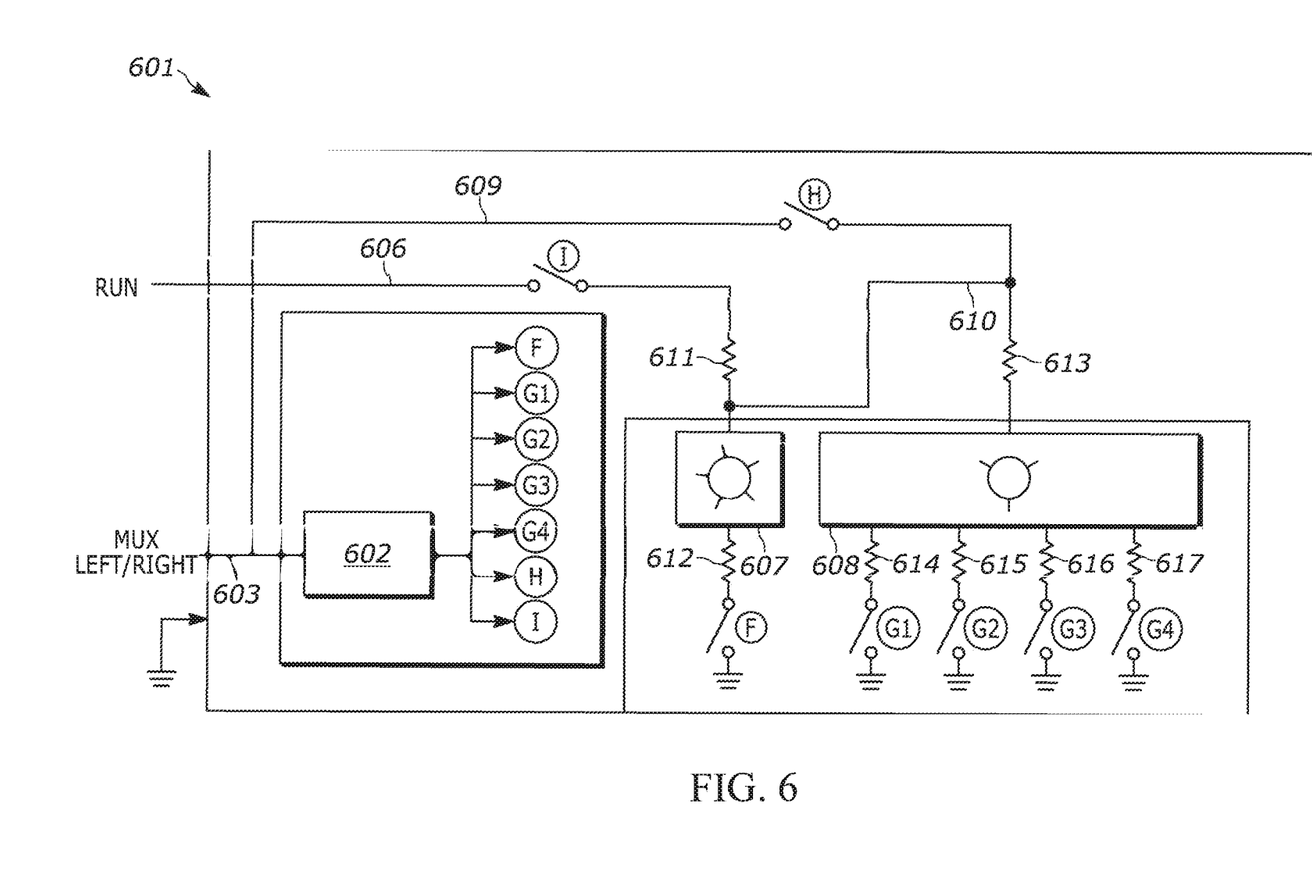
FIG. 6 depicts a block diagram incorporating switches and exhibiting the logical objectives of a sequencing turn signal decoding circuit for a smart lighting system incorporating dual-color LEDs.

Referring to FIG. 6, another decoding circuit 601 is depicted. LED array 607 and LED array 608 may actually be the same LED array, but emitting different color light depending upon the states of switches F, G1-4, H, and I and signal delivered to the LED array.

Microcontroller 602 may control switches F, G1-4, H, and I, in a manner consistent with the description of FIG. 5 to change the color of light emitted by the LED Arrays 607, 608. Additionally, in the embodiment shown, switches G1, G2, G3, and G4 may be controlled by microcontroller 602 to induce LEDs within LED Array 608 to light in a particular sequence. For example, a sequenced amber turn signal may be produced. As a non-limiting example, when sequencing of the LED Array 508 is desired in response to a turn signal on line 609, the microcontroller 602 may open in and close switches G1, G2, G3, and G4 in intervals according to a predetermined sequence while opening switches F and I and closing switch H, thus producing a sequenced amber turn signal.

Figure 7:
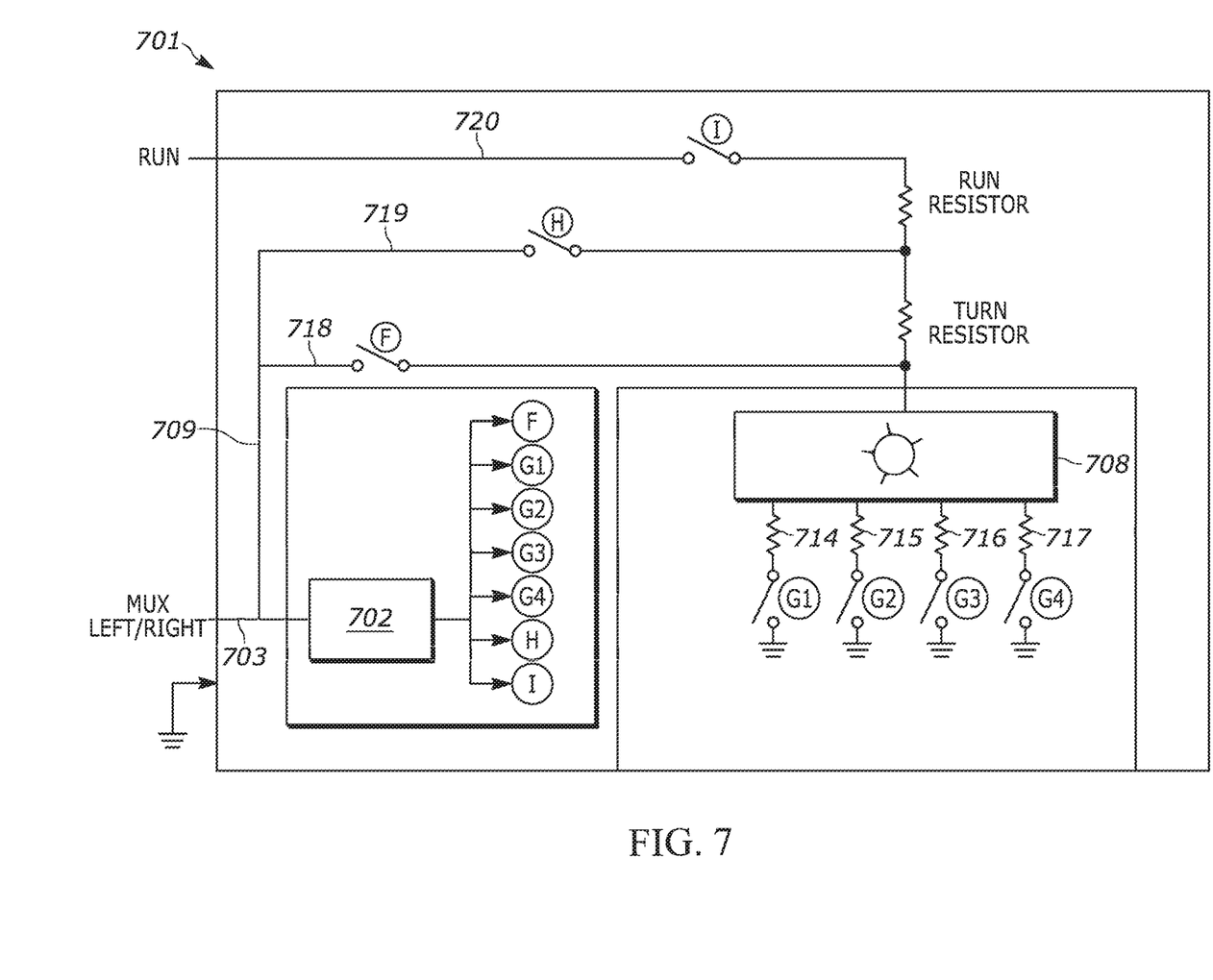
FIG. 7 depicts a block diagram incorporating switches and exhibiting the logical objectives of a sequencing turn signal decoding circuit for a smart lighting system incorporating single-color LEDs.

Referring to an embodiment depicted in FIG. 7, a sequencing turn signal 701 is depicted. The microcontroller may receive a $MUX_{RIGHT}$ 418 or $MUX_{LEFT}$ 420 signal on Demultiplexed signal line 703 from the demultiplexing circuit 401. Demultiplexed signal line 703 may split off along line 709 before once again splitting into line 718 for brake signals and line 719 for turn signals. Microcontroller 702 may be configured to control switches F, G1-4, H, and I on the basis of the signal received on Demultiplexed signal line 603. When the signal received on line 703 indicates a brake with no turn, microcontroller 602 may close switch F and switches G1-4, and open switches H and I to produce a solid red brake light via LED array 708. Each of switches G1, G2, G3, and G4 may be in electrical communication with their own associated LED or plurality of LEDs within LED array 708. In the embodiment shown, when switch G2 is closed, it may be the case that only LEDs within LED array 708 that are in electrical communication with switch G2 are lit. When the signal received on line 703 indicates a turn, microcontroller 702 may open switches F and I, close switch F, and sequentially open and close switches G1, G2, G3, and G4 to produce a sequenced red turn signal via LED array 708. As a non-limiting example, Switch G1 may close for 125 ms, then switch G2 may also be closed for 125 ms, then switch G3 may also be closed for 125 ms, then switch G4 may also be closed for 125 ms. Thus, in such an embodiment, G1 may close for 500 ms, G2 may close for 375 ms, G3 may close for 250 ms, and G4 may close for 125 ms. Afterward, switches G1-4 may be opened at the same time for 500 ms and the sequence may repeat to indicate a turn signal. When the signal received on line 703 indicates no brake and no turn, microcontroller 702 may close switches G1-4 and switch I, and open switches H and F to produce a dim solid red brake light via LED array 708.

It is contemplated that a control circuit as described may be incorporated into a vehicle's wiring system. In some embodiments, a control circuit may be included as part of a vehicle's original equipment. In other embodiments, a control circuit may be constructed and arranged to be incorporated into the existing vehicle wiring system of a vehicle. In still other embodiments, a control circuit may be constructed and arranged to be removable incorporated into a vehicle's wiring system regardless of whether the incorporation occurs during manufacturing or at a later point. In a number of embodiments, a control circuit may be configured in a wiring harness arrangement. In some cases, a wiring harness may include one or more connectors that connect into the various inputs and light outputs, such that a technician may install the control circuit using existing connectors of a vehicle's wiring system.

It is also contemplated that a vehicle may include a CAN-bus that may enable communication between vehicle components. A power sink may be associated with at least one signal light input. The power sink may act as a load on a signal light input line. Without such a power sink, a vehicle's electronics system may interpret a lack of load on a signal light input line as an indication that the signal light associated with the input line is missing or is not functioning properly. The power sink may provide a load to prevent this occurrence. In one embodiment, a power sink comprises a resistor, or a plurality of resistors.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

What is claimed is:

1. A control system for a turn/brake light of a vehicle, comprising:
    a demultiplexing circuit configured to receive a plurality of analog voltage inputs and to deliver an analog voltage output based at least upon the plurality of inputs; and
    a light emitter connected to the demultiplexing circuit, the light emitter including at least one dual-color LED configured to be selectively illuminated based on the analog voltage output,
    wherein the analog voltage inputs include a turn/brake signal,
    wherein the analog voltage output includes a first output voltage and a second output voltage, and wherein the dual-color LED produces a first color output in response to the first output voltage level and a second color output in response to the second output voltage level.

2. The control system of claim 1, wherein the first output voltage is one of a left brake turn signal voltage, a right brake turn signal voltage, a left turn only signal voltage, a right turn only signal voltage, and a brake only signal voltage.

3. The control system of claim 1, wherein the demultiplexing circuit includes a controller configured to operate a plurality of switches based at least upon the analog voltage output.

4. The control system of claim 3, wherein the operation of the plurality of switches delivers either the first output voltage to the dual-colored LED or the second output voltage to the dual-colored LED.

5. The control system of claim 1 wherein the first color output is red and the second color output is amber.

6. The control system of claim 1 further comprising a strobe pattern generator and a strobe pattern selector connected to the demultiplexing circuit,
wherein the strobe pattern selector is configured to select a strobe pattern; and
wherein the strobe pattern generator is configured to generate the selected strobe pattern in response to the voltage inputs and deliver the strobe pattern to the demultiplexing circuit.

7. The control system of claim 6 wherein the strobe pattern is selectable via a user interface.

8. The control system of claim 7 wherein the user interface comprises a switch with switch positions corresponding to available strobe patterns.

9. A method of selectively lighting a smart rear lighting system light comprising:
receiving a plurality of analog voltage inputs from a vehicle including an analog voltage turn/brake signal;
responsive to the plurality of analog voltage inputs, delivering a first output voltage and a second output voltage to a voltage-sensitive dual-color LED of a vehicle turn/brake light;
wherein the voltage-sensitive dual-color LED produces a first color output in response to the first output voltage level and a second color output in response to the second output voltage level.

10. The method of claim 9 wherein delivering a first output voltage and a second output voltage to a voltage-sensitive dual-colored LED of a vehicle turn/brake light comprises demultiplexing at least one of a left turn brake signal voltage, a right turn brake signal voltage, or a brake only signal voltage with a multiplexer to produce the first output voltage level and second output voltage level.

11. The method of claim 10, wherein demultiplexing the left turn brake signal voltage comprises:
using the multiplexer to receive the brake only voltage signal, and the left turn brake signal;
using the multiplexer to correlate the voltage signals of the brake only voltage signal, and the left turn brake signal; and,
using the multiplexer to produce an output voltage signal indicative of the fact that the vehicle is making a left turn without braking.

12. The method of claim 10, wherein demultiplexing the right turn brake signal voltage comprises:
using the multiplexer to receive the brake only voltage signal, and the right turn brake signal;
using the multiplexer to correlate the voltage signals of the brake only voltage signal, and the right turn brake signal; and,
using the multiplexer to produce an output voltage signal indicative of the fact that the vehicle is making a right turn without braking.

13. The method of claim 9, wherein the voltage-sensitive dual-color LED is configured to emit red light when it receives the first output voltage as input and to emit amber light when it receives to the second output voltage as input.

14. A control circuit that selectively operates a turn/brake light of a vehicle, comprising:
a demultiplexing circuit configured to receive a plurality of analog voltage inputs and to deliver an analog voltage output based at least upon the plurality of inputs;
an output stage including a plurality of switches to selectively operate an LED array; and
a controller configured to control the output stage to illuminate the LED array, the controller being configured to operate the plurality of switches to display a first sequence on the LED array,
wherein the analog voltage inputs include a turn/brake signal produced by a vehicle,
wherein the analog voltage output includes a first voltage output and a second voltage output, and
wherein the LED array includes a plurality of dual-color LED's and produces a first color output in response to the first voltage level and a second color output in response to the second voltage level.

15. The control circuit of claim 14, wherein operating the plurality of switches to display a first sequence comprises:
closing a first switch for first time period;
subsequently closing a second switch for a second time period in addition to the closing of the first switch;
subsequently closing a third switch for a third time period in addition to the closing of the first and second switches; and
subsequently closing a fourth switch for a fourth time period in addition to the closing of the first, second, and third switches.

16. The control circuit of claim 15, wherein the first time period is 500 ms, the second time period is 375 ms, the third time period is 250 ms, and the fourth time period is 125 ms.

17. The control circuit of claim 15, wherein the first time period is 125 ms, the second time period is 125 ms, the third time period is 125 ms, and the fourth time period is 125 ms.

18. The control circuit of claim 15, wherein the first sequence is selectable via a user interface.

19. The control circuit of claim 18, wherein the user interface comprises a rotary switch with switch positions corresponding to available sequences.

20. The control circuit of claim 14, further comprising a strobe pattern generator and a strobe pattern selector connected to the demultiplexing circuit,
wherein the strobe pattern selector is configured to select a strobe pattern based upon user input, and
wherein the strobe pattern generator is configured to generate the selected strobe pattern in response to the voltage inputs and deliver the strobe pattern to the demultiplexing circuit.

* * * * *